(12) United States Patent
Liu et al.

(10) Patent No.: US 11,568,550 B2
(45) Date of Patent: Jan. 31, 2023

(54) METHOD, PROCESSING DEVICE, AND SYSTEM FOR OBJECT TRACKING

(71) Applicant: Industrial Technology Research Institute, Hsinchu (TW)

(72) Inventors: Te-Chih Liu, Taoyuan (TW); Jian-Lung Chen, Taoyuan (TW); Yu-Hsin Lin, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 244 days.

(21) Appl. No.: 17/105,666

(22) Filed: Nov. 27, 2020

(65) Prior Publication Data

US 2022/0122274 A1 Apr. 21, 2022

(30) Foreign Application Priority Data

Oct. 21, 2020 (TW) .................. 109136555

(51) Int. Cl.
| | |
|---|---|
| *G06T 7/292* | (2017.01) |
| *G06T 7/70* | (2017.01) |
| *G06T 7/55* | (2017.01) |
| *H04N 5/247* | (2006.01) |
| *G06V 10/10* | (2022.01) |
| *G06V 10/20* | (2022.01) |

(Continued)

(52) U.S. Cl.
CPC ............ *G06T 7/292* (2017.01); *G06K 9/6289* (2013.01); *G06T 7/55* (2017.01); *G06T 7/70* (2017.01); *G06V 10/10* (2022.01); *G06V 10/20* (2022.01); *G06V 40/166* (2022.01); *H04N 5/247* (2013.01); *G06T 2207/30201* (2013.01)

(58) Field of Classification Search
CPC ... H04N 13/239; H04N 13/243; H04N 13/204
See application file for complete search history.

(56) References Cited

U.S. PATENT DOCUMENTS

| | | | |
|---|---|---|---|
| 6,842,175 | B1 | 1/2005 | Schmalstieg et al. |
| 10,482,574 | B2 | 11/2019 | Adsumilli et al. |

(Continued)

FOREIGN PATENT DOCUMENTS

| | | |
|---|---|---|
| CN | 109286782 | 1/2019 |
| TW | I511081 | 12/2015 |

(Continued)

OTHER PUBLICATIONS

"Office Action of Taiwan Counterpart Application", dated Jul. 12, 2021, p. 1-p. 16.

*Primary Examiner* — Clifford Hilaire
(74) *Attorney, Agent, or Firm* — JCIPRNET

(57) ABSTRACT

A method, a processing device, and a system for object tracking are proposed. The method includes the following steps. Imaging capturing is performed on an actual scene by using a primary camera and at least one secondary camera to respectively generate a primary image and at least one secondary image. Image stacking is performed on the primary image and the at least one secondary image to generate a stacked image. Position information and depth information of each object in the stacked image are computed. Whether there exist same objects among the objects in the stacked images is determined based on the position information and the depth information of each of the objects.

20 Claims, 11 Drawing Sheets

(51) Int. Cl.
 *G06V 40/16* (2022.01)
 *G06K 9/62* (2022.01)

(56) References Cited

U.S. PATENT DOCUMENTS

| | | | | |
|---|---|---|---|---|
| 2002/0041327 A1* | 4/2002 | Hildreth | ............... | G06F 3/017 |
| | | | | 348/E13.016 |
| 2011/0141235 A1* | 6/2011 | Tsukagoshi | .......... | H04N 21/236 |
| | | | | 348/E13.001 |
| 2012/0327195 A1 | 12/2012 | Cheng | | |

FOREIGN PATENT DOCUMENTS

| | | |
|---|---|---|
| TW | I539226 | 6/2016 |
| TW | 201719579 | 6/2017 |

* cited by examiner

METHOD, PROCESSING DEVICE, AND SYSTEM FOR OBJECT TRACKING

CROSS-REFERENCE TO RELATED APPLICATION

This application claims the priority benefit of Taiwan application serial no. 109136555, filed on Oct. 21, 2020. The entirety of the above-mentioned patent application is hereby incorporated by reference herein and made a part of this specification.

TECHNICAL FIELD

The disclosure relates to a technology for object tracking.

BACKGROUND

With the development of image processing technology and spatial positioning technology, the application of interactive displays has received increased attention. This kind of technology can produce interactive experience according to the user's operating requirements, and present information in a more intuitive way. However, the single-camera system covers a limited field of view and cannot meet the requirements for large-scale operations. The fisheye camera system will distort the image, making the human face difficult to recognize. Although the multi-camera system can cover a larger field of view, in cross-view face tracking, not only that it is necessary to perform a large number of computations on feature comparison, image stitching, and image recognition for the overlapping area of the field of view, there are concerns about repeated computation on human face.

SUMMARY

In an exemplary embodiment of the disclosure, the method includes the following steps. Imaging capturing is performed on an actual scene by using a primary camera and at least one secondary camera to respectively generate a primary image and at least one secondary image. Image stacking is performed on the primary image and the at least one secondary image to generate a stacked image. Position information and depth information of each object in the stacked image are computed. Whether there exist same objects among the objects in the stacked images is determined based on the position information and the depth information of each of the objects.

In an exemplary embodiment of the disclosure, the processing device is connected to the primary camera and at least one secondary camera, and includes a memory and a processor. The memory is configured to store data. The processor is configured to receive the primary image and at least one secondary image respectively generated by image capturing performed on the actual scene by using the primary camera and the at least one secondary camera, and then perform image stacking on the primary image and the at least one secondary image to generate a stacked image. Moreover, the processor computes the position information and depth information of each of the objects in the stacked image, and determines whether there exist same objects among all objects in the stacked image according to the position information and depth information of each of the objects.

In an exemplary embodiment of the disclosure, the system includes a primary camera, at least one secondary camera, and a processing device. The primary camera is configured to perform image capturing on the actual scene to generate the primary image. The at least one secondary camera is configured to perform image capturing on the actual scene to generate at least one secondary image. The processing device is connected to the primary camera and at least one secondary camera to obtain the primary image and at least one secondary image, and then perform image stacking on the primary image and the at least one secondary image to generate the stacked image. Moreover, the processing device computes the position information and depth information of each of the objects in the stacked image, and determines whether there exist same objects among all objects in the stacked image according to the position information and depth information of each of the objects.

Several exemplary embodiments accompanied with figures are described in detail below to further describe the disclosure in details.

DETAILED DESCRIPTION OF DISCLOSED EMBODIMENTS

Part of the exemplary embodiments of the disclosure will be described in detail in conjunction with the accompanying drawings. The reference symbols in the following description will be regarded as the same or similar elements when the same element symbols are shown in different drawings. These exemplary embodiments are only a part of the disclosure, and do not disclose all the implementation methods of the disclosure. To be more precise, these exemplary embodiments are only examples of the methods, devices, and systems described in the scope of the disclosure.

Figure 1:
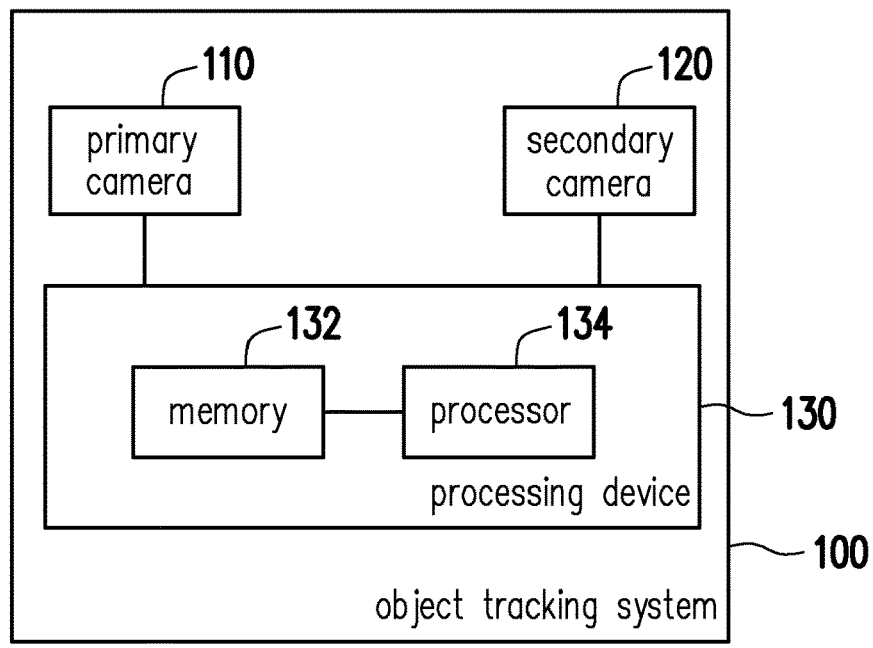
FIG. 1 is a schematic diagram illustrating an object tracking system according to an exemplary embodiment of the disclosure.

FIG. 1 is a schematic diagram illustrating an object tracking system according to an exemplary embodiment of the disclosure. First, FIG. 1 introduces the various components and configuration relationships in the system. The detailed functions will be disclosed together with the flowcharts in the subsequent exemplary embodiments.

Referring to FIG. 1, the object tracking system 100 includes a primary camera 110, at least one secondary camera 120, and a processing device 130. The processing device 130 may be wirelessly, wired or electrically connected to the primary camera 110 and the secondary camera 120. It should be noted that in this exemplary embodiment, only one secondary camera 120 is shown as an example, while in other exemplary embodiments, there may be a plurality of secondary cameras 120.

The primary camera 110 and the secondary camera 120 may include an image sensor and a depth sensor, that is, the primary camera 110 and the secondary camera 120 may have image capturing and depth capturing functions. The image sensor is configured to capture images, and it is, for example, a camera lens with a lens and a photosensitive component. The photosensitive component is configured to sense the intensity of light entering the lens to generate an image. The photosensitive component may be, for example, a charge coupled device (CCD), a complementary metal-oxide semiconductor (CMOS) component, or other similar components. The depth sensor is configured to detect depth information, and it can be implemented through the active depth sensing technology and passive depth sensing technology. The active depth sensing technology can compute depth information by actively emitting light sources, infrared ray, ultrasonic, laser, etc. as signals to work with time difference ranging technology. The passive depth sensing technology can use two image sensors to simultaneously capture two images in front of them from different viewing angles, so as to use the parallax of the two images to compute depth information.

The processing device 130 is configured to process the images captured by the primary camera 110 and the secondary camera 120 to execute the processes in the various exemplary embodiments of the disclosure. The processing device 130 includes a memory 132 and a processor 134. The memory 132 may be, for example, any type of fixed or removable random access memory (RAM), read-only memory (ROM), flash memory, hard disk or other similar devices, integrated circuits, or combinations thereof. The processor 134 may be, for example, a central processing unit (CPU), an application processor (AP), or other programmable general-purpose or special-purpose microprocessors, a digital signal processor (DSP), an image signal processor (ISP), a graphics processing unit (GPU) or other similar devices, integrated circuits, or combinations thereof.

Figure 2:
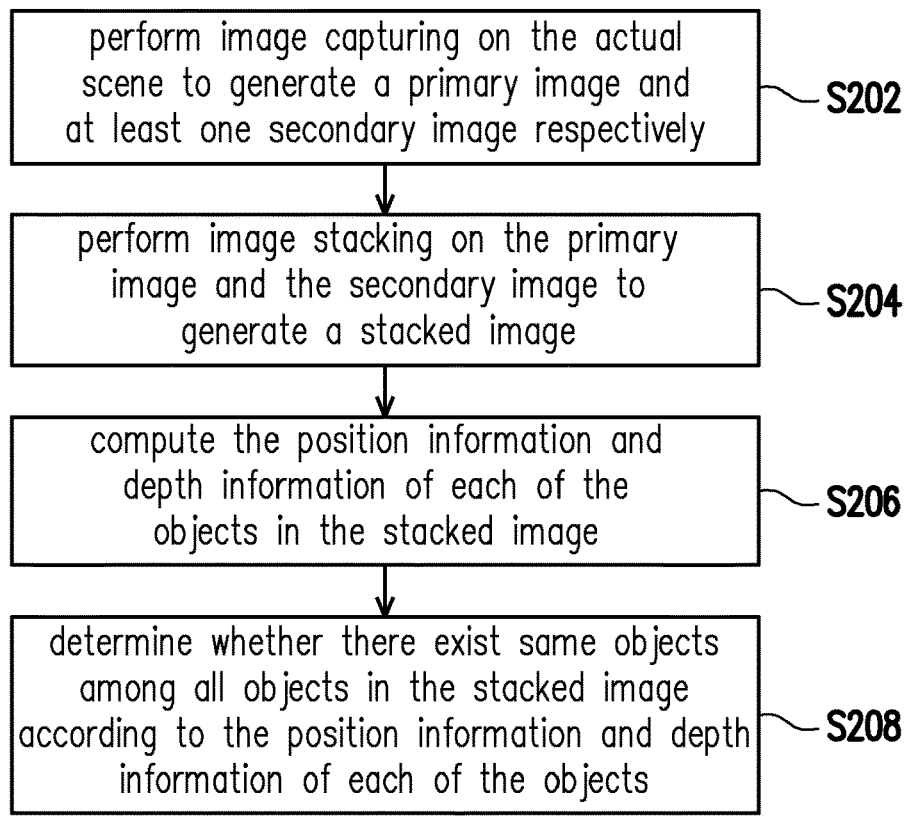
FIG. 2 is a flowchart of an object tracking method according to an exemplary embodiment of the disclosure.

FIG. 2 is a flowchart of an object tracking method according to an exemplary embodiment of the disclosure. The process flow in FIG. 2 can be implemented by using the object tracking system 100 of FIG. 1.

Please refer to FIG. 1 and FIG. 2 both. First, the primary camera 110 and the at least one secondary camera 120 will perform image capturing on the actual scene to generate a primary image and at least one secondary image respectively (step S202). In other words, the primary camera 110 and the secondary camera 120 will simultaneously capture images of the actual scene from different viewing angles to generate images with different fields of view. Next, the processing device 130 will perform image stacking on the primary image and the secondary image to generate a stacked image (step S204), and will compute the position information and depth information of each of the objects in the stacked image (step S206). The image stacking here can be horizontal stacking (stacking in left-right direction) or vertical stacking (stacking in up-down direction) performed on the primary and secondary images.

In an exemplary embodiment, the processing device 130 may determine whether the primary camera 110 and the secondary camera 120 are in horizontal shooting mode or in vertical shooting mode to determine the way of image stacking, so as to reduce the impact, resulting from the amount of deformation caused by image staking, caused on recognition rate. For example, when the primary camera 110 and the secondary camera 120 are in horizontal shooting mode and the camera resolution is 640×360, the image resolution after horizontal stacking is 1280×360, and the image resolution after vertical stacking is 640×720. Generally speaking, before the processing device 130 performs face recognition, for example, the stacked image is scaled to an image resolution of 300×300. The horizontally stacked image will be dramatically deformed, resulting in a decrease in the recognition rate. Take two videos clips with a resolution of 640×360 and a length of 74 seconds as an example. Face recognition is performed after stacking is performed on the two video clips respectively. The recognition result shows that higher recognition rate can be obtained through vertical stacking. Based on this, when the primary camera 110 and the secondary camera 120 are in horizontal shooting mode, the processing device 130 will perform vertical stacking on the primary image and the secondary image to generate the stacked image. When the primary camera 110 and the secondary camera 120 are in vertical shooting mode, the processing device 130 performs horizontal stacking on the primary image and the secondary image to generate the stacked image.

Next, the processing device 130 computes the position information and depth information of each of the objects in the stacked image (step S206), and determine whether there exist same objects among all objects in the stacked image according to the position information and depth information of each of the objects (step S208). For example, when the processing device 130 determines that the positions and depths of the two objects corresponding to the primary image and the secondary image in the stacked image have a corresponding relationship, the two objects will be regarded as the same object. In other words, in this exemplary embodiment, image stacking is performed to replace image stitching to perform cross-view object tracking, which can achieve the effect with less computation amount and computation time. Thereafter, the processing device 130 may perform subsequent processing on the same object according to the actual application situation.

For clarity, the details of the process in FIG. 2 will be described in the following exemplary embodiment with reference to different application scenarios of the object tracking system 100.

Figure 3:
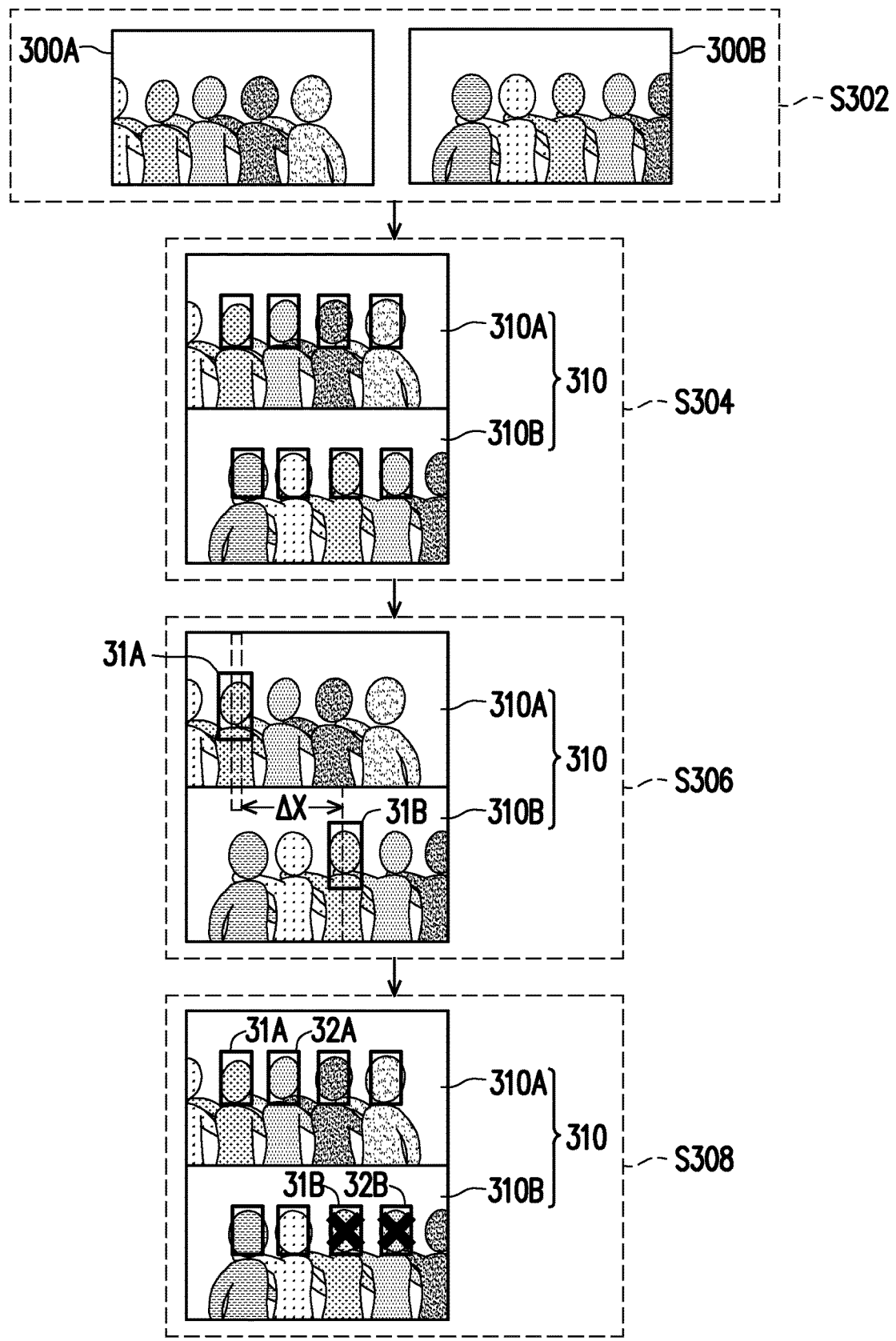
FIG. 3 is a schematic diagram illustrating an application scenario of an object tracking method according to an exemplary embodiment of the disclosure.

FIG. 3 is a schematic diagram illustrating an application scenario of an object tracking method according to an exemplary embodiment of the disclosure. In this exemplary embodiment, it is assumed that the primary camera 110 and the secondary camera 120 of the object tracking system 100 are two cameras configured in parallel, and the tracked object is a human face.

Please refer to FIG. 1 and FIG. 3 first, the primary camera 110 and the secondary camera 120 will perform image capturing on the actual scene to generate the primary image 300A and the secondary image 300B respectively (step S302). Next, the processing device 130 performs image stacking on the primary image 300A and the secondary image 300B to generate a stacked image 310 (step S304). In this exemplary embodiment, the processing device 130 performs image stacking on the primary image 300A and the secondary image 300B in a vertical stacking manner, wherein the primary region 310A and the secondary region 310B in the stacked image 310 correspond to the primary image 300A and the secondary image 300B respectively.

Next, the processing device 130 identifies each region of the face from the stacked image, and computes the position information and depth information of each face, so as to determine whether there is the same face in the primary region 310A and the secondary region 310B in the stacked image 310. Here, the processing device 130 determines whether there is the same face in the primary region 310A and the secondary region 310B in the stacked image 310 according to three conditions, namely vertical coordinate, depth information, and horizontal coordinate (step S306).

In this exemplary embodiment, the processing device 130 may first determine the vertical coordinate. When the processing device 130 determines that the vertical coordinate of the face 31A in the primary region 310A is the same as the vertical coordinate of the face 31B in the secondary region 310B, the processing device 130 will determine the depth. When the processing device 130 determines that the depth of the face 31A is the same as the depth of the face 31B, the processing device 130 will determine the horizontal coordinate. Next, the processing device 130 will determine whether the difference between the horizontal coordinate of the face 31A in the primary region 310A and the horizontal coordinate of the face 31B in the secondary region 310B is the same as the pixel displacement ΔX. Here, the processing device 130 will compute the pixel displacement ΔX according to the horizontal resolution and the horizontal distance of a field of view of the secondary camera 120 as well as the distance between the lenses of the primary camera 110 and the secondary camera 120. The following FIG. 4A and FIG. 4B will illustrate the schematic diagrams of the method of computing pixel displacement ΔX.

Figure 4A:
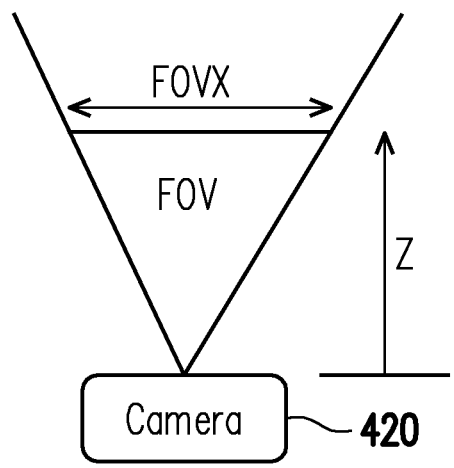
FIG. 4A and FIG. 4B are schematic diagrams illustrating a method for computing pixel displacement according to an exemplary embodiment of the disclosure.
Figure 4B:
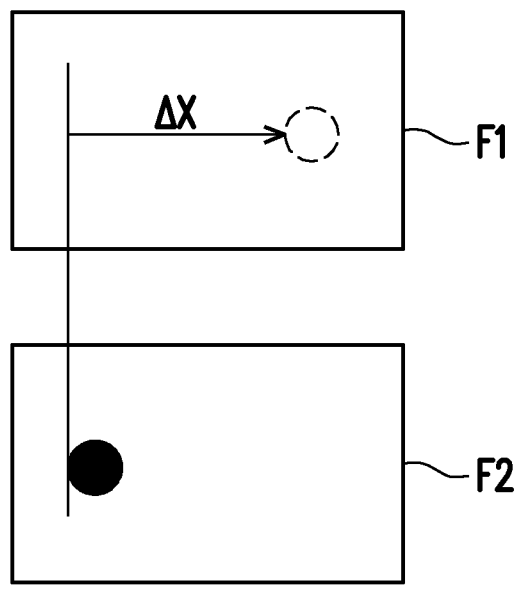

Please refer to FIG. 4A first, considering the position relative to the depth Z (in mm) of the camera 420, based on the definition of the horizontal field of view FOV of the camera 420, the horizontal field of view distance FOVX (in mm) can be computed as Equation (1):

$$FOVX = 2 \times Z \times \tan\frac{FOV}{2} \tag{1}$$

Please refer to FIG. 4B again. When a camera moves by a certain distance horizontally, for a stationary subject to be captured, which is equivalent to that the camera is stationary and the subject to be captured moves by the same distance in the opposite direction. From another perspective, when the two cameras are separated by a certain distance, the difference ΔX (correction value required for horizontal pixels) between the horizontal pixel coordinates of the same object 42 in the fields of view F2 and F1 captured by the two cameras is computed, which is equivalent to computing the pixel distance between two objects separated by a certain distance and captured by the same camera. Based on the above, the following two equations (2) and (3) can be derived from the above concept:

$$\text{Screen ratio} = \frac{\Delta X}{RSX} \tag{2}$$

$$\text{Screen ratio} = \frac{L}{FOVX} \tag{3}$$

wherein RSX is the horizontal resolution, and L is the distance between the two lenses. If equations (2) and (3) are combined, and then substitute the equation (3) therein, equation (4) for computing pixel displacement ΔX can be obtained:

$$\Delta X = \frac{RSX \times L}{2 \times Z \times \tan\frac{FOV}{2}} = \frac{0.5 \times RSX \times L \times \cot\left(\frac{FOV}{2}\right)}{Z} \tag{4}$$

In other words, pixel displacement =

$$\frac{0.5 \times \text{horizontal resolution} \times \text{distance between two lenses} \times \cot\left(\frac{\text{horizontal field of view of camera}}{2}\right)}{(\text{depth})}$$

For example, assuming that the distance L between the lenses of the primary camera and the secondary camera is 15 cm, the image resolution RSX is 640×360, the horizontal field of view FOV of the camera is 75 degrees, and the pixel displacement ΔX of the pixels of the secondary camera converting into the corresponding pixels of the primary camera is computed as shown in equation (5):

$$\Delta X = \frac{0.5 \times 640 \times 200 \times \cot\left(\frac{75}{2}\right)}{Z} \cong \frac{83408}{Z} = f(z) \tag{5}$$

In order to reduce the amount of computation, the above equation (5) can be expanded to multiple terms around a depth of Z=600 mm according to the Taylor series in equation (5.1) (that is, with a substitution of a=600), and only the first three terms are considered to generate equation (5.2). The reason that the depth Z=600 mm is adopted here is that the error will be too large if the depth Z is set as the near point (Z=200 mm) and the far point (Z=1000 mm):

$$f(x) = \sum_{n=0}^{\infty} \frac{f^{(n)}(a)}{n!}(x-a)^n \tag{5.1}$$

$$f(z) = \frac{f(a)}{0!}(z-a)^0 + \frac{f'(a)}{1!}(z-a)^1 + \frac{f''(a)}{2!}(z-a)^2 \tag{5.2}$$

wherein:

$$f(z) = \frac{83408}{z}, \quad f(a) = f(600) = \frac{83408}{600} = 139.01$$

$$f'(z) = -\frac{83408}{z^2}, \quad f'(a) = f'(600) = -\frac{83408}{600^2} = -0.232$$

$$f''(z) = 2 \times \frac{83408}{z^3}, \quad f''(a) = f''(600) = 2 \times \frac{83408}{600^3} = 0.000772$$

Therefore, equation (5.2) can be written as the following equation (5.3):

$$f(z) = \frac{13901}{0!}(z-600)^0 + \frac{-0.232}{1!}(z-600)^1 + \frac{0.000772}{2!}(z-600)^2 \quad (5.3)$$

If equation (5.3) is expanded, the two-fold polynomial of equation (6) can be obtained:

$$f(z) = \Delta X = 0.00039 Z^2 - 0.7Z + 417 \quad (6)$$

Please refer to FIG. 3 again. After computing the pixel displacement ΔX, the processing device 130 will determine the horizontal coordinate. When the processing device 130 determines that the difference between the horizontal coordinate of the face 31A and the horizontal coordinate of the face 31B is the same as the pixel displacement ΔX, it means that the face 31A and the face 31B are the same face. Taking this exemplary embodiment as an example, after the processing device 130 has completed step S306 for determining other faces, the processing device 130 will determine that the faces 31A and 32A in the primary region 310A are the same as the faces 31B and 32B in the secondary region 310B. Therefore, the processing device 130 may perform subsequent processing on the faces 31B and 32B captured by the secondary camera 120B, such as determining that the faces 31B and 32B are repeated without performing subsequent related computation (step S308).

It should be noted that those skilled in the art should understand that the processing device 130 determining whether the difference between the horizontal coordinate of the face 31A and the horizontal coordinate of the face 31B is the same as the pixel displacement ΔX is performed on the premise that there is an allowed tolerance threshold. For example, when the image resolution is 640×360 and the distance L between the lenses of the primary camera and the secondary camera is 10 cm, the equation (6.5) will be adopted for converting the pixel coordinates (px,py) of the secondary camera into the pixel coordinates (px',py') of the primary camera:

$$\begin{cases} px' = px + \Delta X \\ py' = py \end{cases}$$

wherein $\Delta X = 5.83 \times 10^{-4} Z^2 - 1.052Z + 570.7$, and the unit of Z is mm. Assuming that the distance between the pixel coordinates (px', py') of the face 31B in the secondary region 310B converted to the primary region 310A and the pixel coordinates of the face 31A in the primary region 310A is less than the distance threshold d, it will be determined that the face 31B is a repetition. Assuming that there is no face in the range set within a distance d from the pixel coordinates (px', py') in the primary region 310A, it will be determined that the face 31B is not a repetition.

In another exemplary embodiment, the processing device 130 may first determine the depth. When the processing device 130 determines that the depth of the face 31A in the primary region 310A is the same as the depth of the face 31B in the secondary region 310B, the processing device 130 will determine the vertical coordinates. When the processing device 130 determines that the vertical coordinate of the face 31A is the same as the vertical coordinate of the face 31B, the processing device 130 will determine the horizontal coordinates. Details of this exemplary embodiment can be inferred from the foregoing descriptions and no more repetition is incorporated herein.

It should be noted that those with ordinary knowledge in the field should understand that determining whether the vertical coordinates, depth information, and horizontal coordinates (hereinafter referred to as "vertical condition", "depth condition", "horizontal condition") of the face 31A and the face B are satisfied is determined based on the premise that there is an allowed tolerance threshold. Determining whether the vertical coordinates of the face 31A in the primary region 310A and the face 32B in the secondary region 310B are the same refers to determining whether the difference (hereinafter referred to as the "vertical difference") between the vertical coordinate of the face 32B in the secondary region 310B and the vertical coordinate of the face 31A in the primary region 310A is less than the vertical tolerance threshold. If so, it is determined that the vertical condition is satisfied. Determining whether the depths of the face 31A in the primary region 310A and the face 32B in the secondary region 310B are the same refers to determining whether the difference (hereinafter referred to as "depth difference") between the depth of the face 32B in the secondary region 310B and the depth of the face 31A in the primary region 310A is less than the depth tolerance threshold. If so, it is determined that the depth condition is satisfied. Determining whether the difference between the horizontal coordinates of the face 31A in the primary region 310A and the face 32B in the secondary region 310B is the same as the pixel displacement refers to determining whether the difference between the pixel displacement and the difference (hereinafter referred to as "horizontal difference") between the horizontal coordinate of the face 32B in the secondary region 310B and the horizontal coordinate of the face 31A in the primary region 310A is less than the horizontal tolerance threshold. If so, it is determined that the horizontal condition is satisfied.

The aforementioned tolerance threshold may be set depending on the actual size of the human face or the distance of the human eye in the image. Considering that two people may be close to each other, the depth tolerance threshold may be less than the diameter of the human head (for example, 16 cm). Taking into account the habit of viewing with a particular eye, the horizontal tolerance threshold can be less than the pixel distance between the left and right eyes when the extreme distance is reached, and the vertical coordinates can be set in the same manner as the horizontal coordinates. For example, the distance (interpupillary distance) between the left and right eyes is 7 to 8 cm. When the camera resolution is 640×360, the horizontal field of view of the camera is 75 degrees, and the extreme distance is 90 cm, the pixel distance between the left and right eyes is 80 pixels. Furthermore, taking into account that the side face or face is overlapped, the preferred tolerance threshold can be ¼ in comparison with the normal situation. For example, the preferred depth tolerance threshold can be set to 40 mm, and the preferred horizontal tolerance threshold and the preferred vertical tolerance threshold can be set to 20 pixels.

Figure 5A:
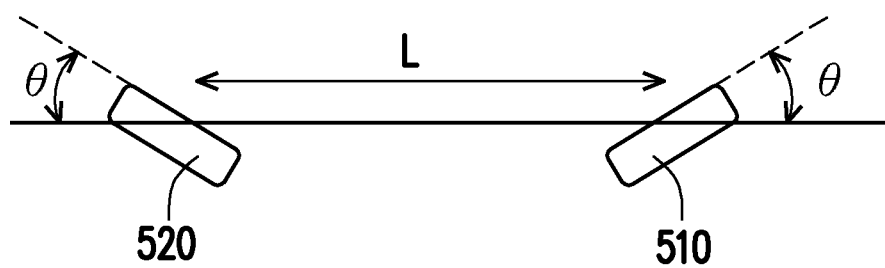
FIG. 5A is a schematic diagram illustrating a camera configuring method according to an exemplary embodiment of the disclosure.

FIG. 3 and FIG. 4 are application scenarios where the primary camera and the secondary camera are configured horizontally with parallel optical axes. When the primary camera and the secondary camera are configured horizontally with the optical axes having an inward-facing angle or an outward-facing angle, the computing method for the pixel displacement will vary. Taking FIG. 5A as an example, which is a schematic diagram illustrating a camera configuring method according to an exemplary embodiment of the disclosure. The primary camera 510 and the secondary camera 520 have an inward-facing angle θ, and the distance between the two lenses is L, and the computation method for pixel displacement can be divided into three steps illustrated in FIG. 5B according to an exemplary embodiment of the disclosure.

Figure 5B:
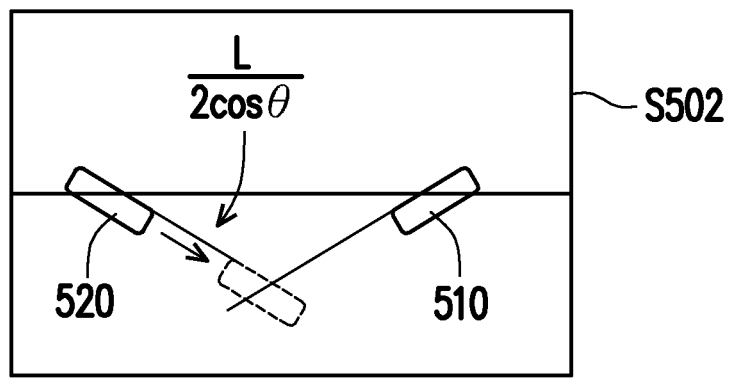
FIG. 5B is a schematic diagram illustrating a method for computing pixel displacement according to an exemplary embodiment of the disclosure.
Figure 5B:
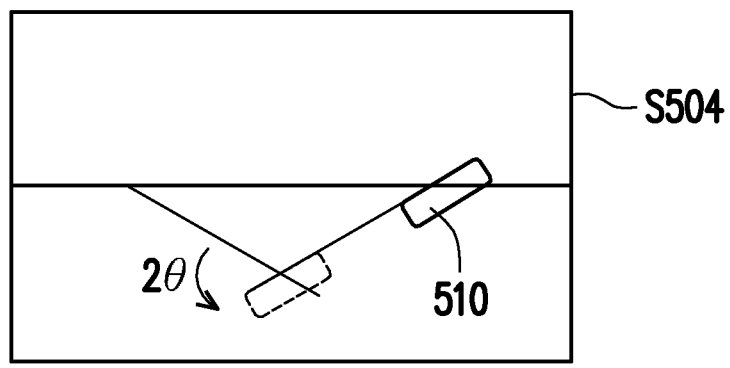
Figure 5B:
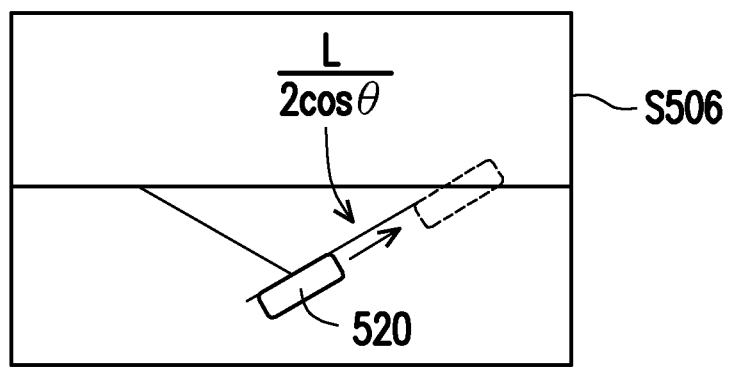

Referring to FIG. 5B, from the perspective of the secondary camera 520, the computation of the pixel displacement can be divided into the translation $$\frac{L}{2\cos\theta}$$

of the secondary camera 520 (step S502), the in-situ rotation 2θ of the secondary camera 520 (step S504) and the continuous translation $$\frac{L}{2\cos\theta}$$

of the secondary camera 520 (step S506). Here, when the rotation angle of the secondary camera 520 is θ, the horizontal pixel displacement ΔX can be expressed by equation (7):

$$\text{pixel displacement } \Delta X = \frac{RSX \times \theta}{FOV} \tag{7}$$

Then, equation (4) is adopted for computation to serve as computation equation for translation of camera, thereby estimating the pixel displacement of the secondary camera 520 in this embodiment. In detail, the horizontal pixel displacement ΔX1 corresponding to the translation $$\frac{L}{2\cos\theta}$$

of the secondary camera 520 can be expressed by equation (8.1):

$$\Delta X1 = \frac{0.25 \times RSX \times L \times \cot\left(\frac{FOV}{2}\right)}{Z\cos\theta} \tag{8.1}$$

The horizontal pixel displacement ΔX2 corresponding to the in-situ rotation 2θ of the secondary camera 520 can be expressed by equation (8.2):

$$\Delta X2 = \frac{2\theta \times RSX}{FOV} \tag{8.2}$$

The horizontal pixel displacement ΔX3 corresponding to the translation $$\frac{L}{2\cos\theta}$$

of the secondary camera 520 can be expressed by equation (8.3):

$$\Delta X3 = \frac{0.25 \times RSX \times L \times \cot\left(\frac{FOV}{2}\right)}{Z\cos\theta} \tag{8.3}$$

Therefore, the total pixel displacement of the secondary camera 520 can be expressed by equation (8.4):

$$\Delta X = \Delta X1 + \Delta X2 + \Delta X3 = \frac{0.5 \times RSX \times L \times \cot\left(\frac{FOV}{2}\right)}{Z\cos\theta} + \frac{2\theta \times RSX}{FOV} \tag{8.4}$$

Similarly, when the primary camera and the secondary camera have an outward-facing angle θ', from the perspective of the secondary camera 520, the computation of the pixel displacement can also be divided into the translation $$\frac{L}{2\cos\theta'}$$

of the secondary camera 520, the in-situ rotation 2θ' of the secondary camera 520 and the continued translation $$\frac{L}{2\cos\theta'}$$

of the secondary camera 520. In detail, the horizontal pixel displacement ΔX1 corresponding to the translation $$\frac{L}{2\cos\theta'}$$

of the secondary camera 520 can be expressed by equation (9.1):

$$\Delta X1 = \frac{0.25 \times RSX \times L \times \cot\left(\frac{FOV}{2}\right)}{Z\cos\theta'} \tag{9.1}$$

The horizontal pixel displacement ΔX2 corresponding to the in-situ rotation 2θ' of the secondary camera 520 can be expressed by equation (9.2):

$$\Delta X2 = -\frac{2\theta' \times RSX}{FOV} \quad (9.2)$$

The horizontal pixel displacement ΔX3 corresponding to the translation $$\frac{L}{2\cos\theta'}$$

of the secondary camera 520 can be expressed by equation (9.3):

$$\Delta X3 = \frac{0.25 \times RSX \times L \times \cot\left(\frac{FOV}{2}\right)}{Z\cos\theta'} \quad (9.3)$$

Therefore, the total pixel displacement of the secondary camera 520 can be expressed by equation (9.4):

$$\Delta X = \quad (9.4)$$

$$\Delta X1 + \Delta X2 + \Delta X3 = \frac{0.5 \times RSX \times L \times \cot\left(\frac{FOV}{2}\right)}{Z\cos\theta'} - \frac{2\theta' \times RSX}{FOV}$$

Figure 6:
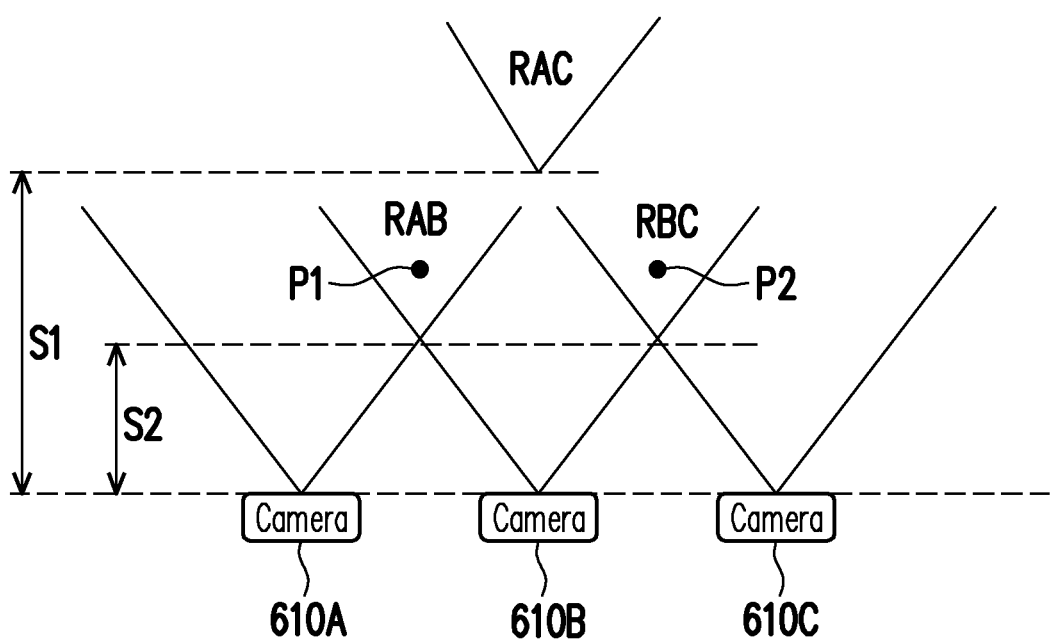
FIG. 6 is a schematic diagram illustrating a configuring method for a multi-camera system according to an exemplary embodiment of the disclosure.

When two cameras are not enough to cover the user's interactive area, cameras can be added to the system to form a modular camera array. In the modular camera array, there will be three cameras or more. FIG. 6 is a schematic diagram illustrating a configuring method for a multi-camera system according to an exemplary embodiment of the disclosure, and the basis for selecting the primary camera will be described below.

Please refer to FIG. 6, assuming that the camera 610A, camera 610B, and camera 610C are three cameras arranged horizontally, RAB is the overlapping region of camera 610A and camera 610B, RBC is the overlapping region of camera 610B and camera 610C, and RAC is the overlapping region of camera 610A and camera 610C. Here, the sum of the overlapping region of each camera and the closest distances S1 and S2 of the camera will be computed, and the camera with the smallest sum will be set as the primary camera, and the remaining cameras are set as the secondary cameras. The distance between each overlapping region and the camera is shown in Table 1:

TABLE 1

|  | Camera 610A | Camera 610B | Camera 610C |
|---|---|---|---|
| Camera 610A | — | S2 | S1 |
| Camera 610B | S2 | — | S2 |
| Camera 610C | S1 | S2 | — |
| Sum | S1 + S2 | 2S2 | S1 + S2 |

The total distance of the overlapping region of the camera 610B is the smallest. The camera 610B can be set as the primary camera, and the camera 610A and the camera 610C can be regarded as secondary cameras.

In addition, when the face is closer to the camera, the pixel displacement corresponding to the camera is larger, so the error in the coordinate conversion is also larger. Therefore, the smaller the number of times of coordinate transformations at close range can also be another basis for selecting the primary camera. Taking camera A and camera B in FIG. 6 as an example, the following table 2 lists the number of times of coordinate transformations required for the face at the position P1 in the overlapping region RAB and the position P2 in the overlapping region RBC:

TABLE 2

| Scenario | number of times of coordinate transformation of P1 | number of times of coordinate transformation of P2 | Sum |
|---|---|---|---|
| The primary camera is camera A | +0 (camera A) +1 (camera B→ camera A) | +1 (camera B→ camera A) +1 (camera C→ camera A) | Three times |
| The primary camera is camera B | +1 (camera A→ camera B) +0 (camera B) | +0 (camera B) +1 (camera C→ camera B) | Two times |

The total number of times of coordinate transformations of camera B is the smallest. Camera B can be set as the primary camera, and camera A and camera C are regarded as secondary cameras.

Figure 7A:
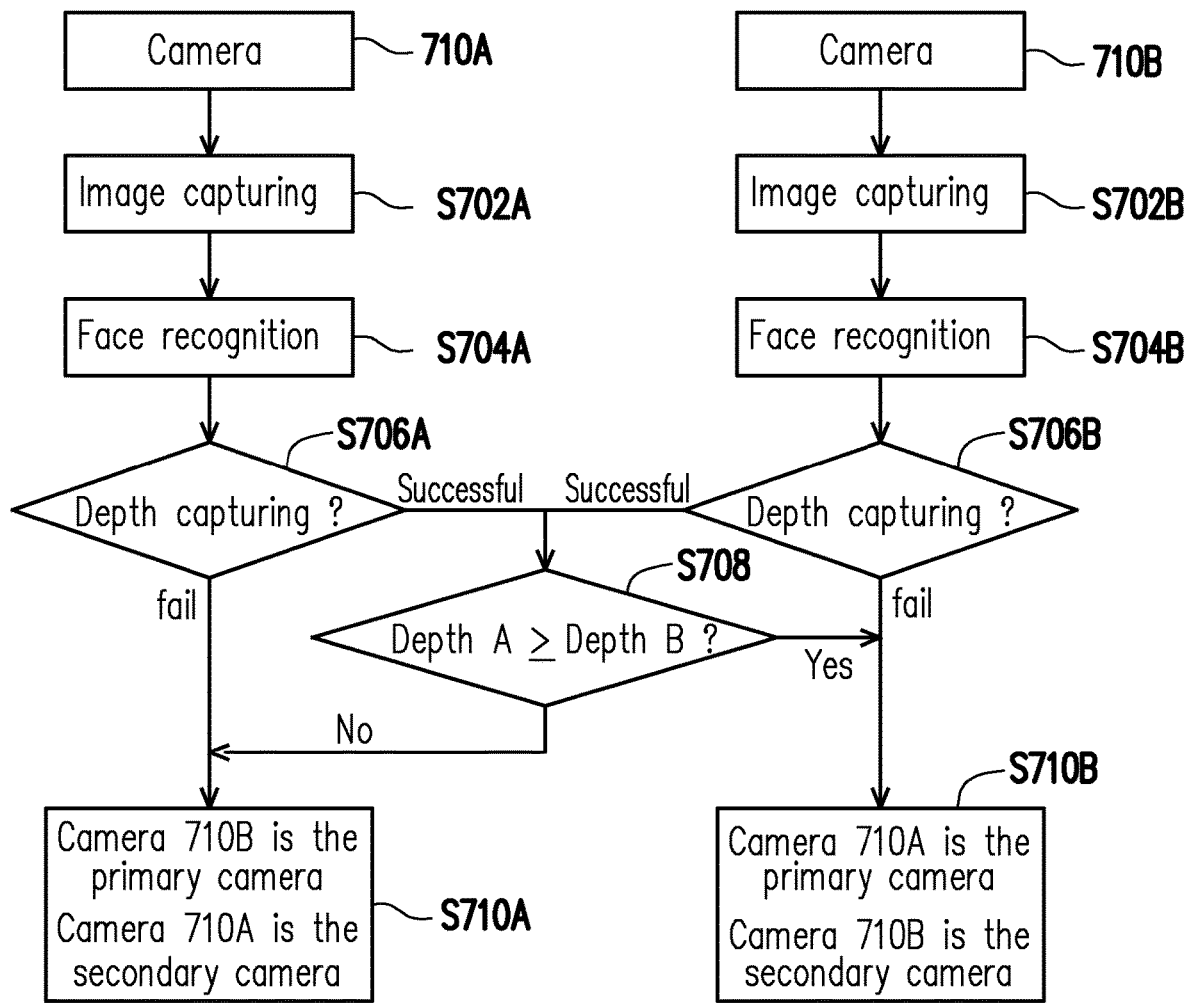
FIG. 7A is a flowchart of a method for selecting a primary camera according to an exemplary embodiment of the disclosure.
Figure 7B:
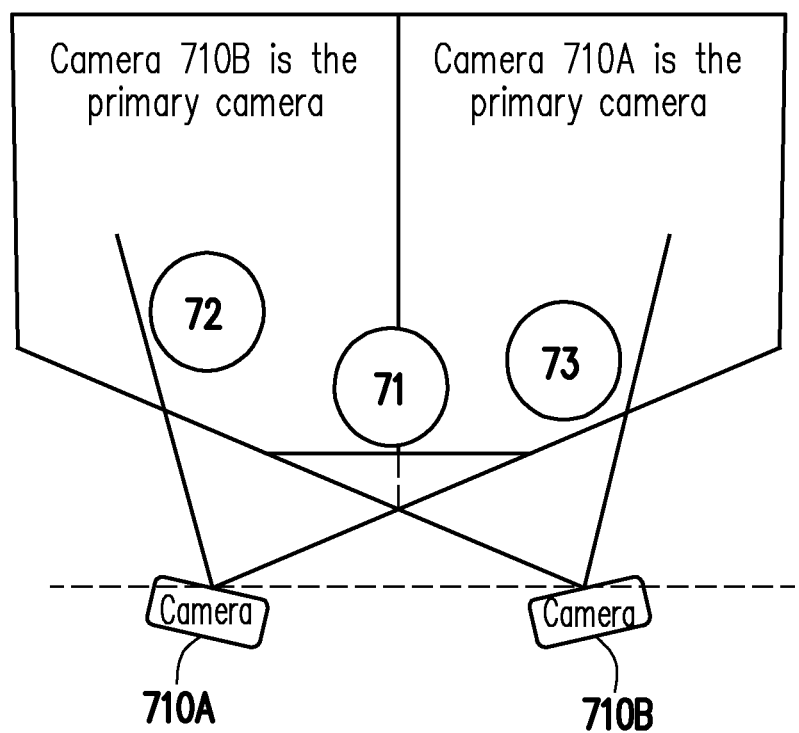
FIG. 7B is a schematic diagram of an application scenario of selecting a primary camera according to an exemplary embodiment of the disclosure.

For use in short-distance, if a camera cannot obtain depth information, it can be dynamically select the primary camera. FIG. 7A is a flowchart of a method for selecting a primary camera according to an exemplary embodiment of the disclosure, and FIG. 7B is a schematic diagram of an application scenario of selecting a primary camera according to an exemplary embodiment of the disclosure.

Please refer to FIG. 1 and FIG. 7A both. The camera 710A and the camera 710B will perform image capturing respectively (step S702A, step S702B), and the processing device 130 will then perform face recognition on the captured image (step S704A, step S704B) to further perform depth capturing on the position of the face (step S706A, step S706B). When the depth capturing of the camera 710A fails, the processing device 130 will set the camera 710A as the secondary camera and set the camera 710B as the primary camera (step S710A). When the depth capturing of the camera 710B fails, the processing device 130 will set the camera 710B as the secondary camera and set the camera 710A as the primary camera (step S710B).

When the depth capturing of the camera 710A and the camera 710B is successful, the processing device 130 may further determine the values of the depth A and the depth B, for example, whether the depth A is greater than or equal to the depth B (step S710). When the depth A is smaller than the depth B, it means that the position corresponding to this depth is closer to the camera A, and the processing device 130 sets the camera 710B as the primary camera and sets the camera 710A as the secondary camera (step S710A). When the depth A is greater than or equal to the depth B, it means that the position corresponding to this depth is closer to the camera 710B or is located at the center of the camera 710A and the camera 710B, then the processing device 130 will set the camera 710B as the secondary camera and set the camera 710A as the primary camera (step S710B).

Please refer to FIG. 7B again, the user 71 is located at the center of the two cameras, and the camera A will be set as the primary camera of the user 71. The user 72 is closer to the camera 710A, and the camera 710B will be set as the primary camera of the user 72. The user 73 is closer to the camera 710B, then the camera 710A will be set as the primary camera of the user 73.

Every camera has a depth detection limit. Assuming that the depth detection limit is 20 cm, it means that the camera cannot detect the depth of objects within 20 cm. By setting up multiple cameras, the depth detection limit can be lowered, and objects at closer distance can be measured. Hereinafter, FIG. 8A to FIG. 8D are schematic diagrams describing a method for shortening the limit of depth detection according to an exemplary embodiment of the disclosure.

Figure 8A:
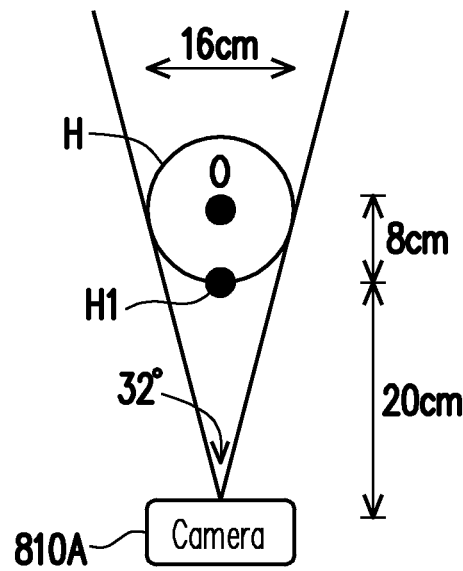
FIG. 8A to FIG. 8D are schematic diagrams of a method for shortening the limit of depth detection according to an exemplary embodiment of the disclosure.
Figure 8B:
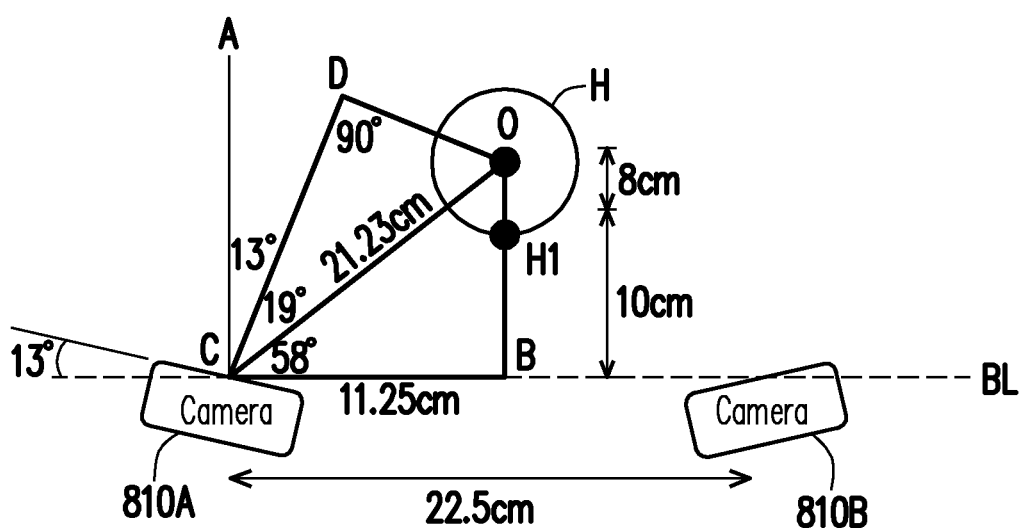

Please refer to FIG. 8A first, for example, the diameter of the user's head H is 16 cm. When the distance between the place between the eyebrows H1 and the camera 810A is 20 cm, the distance between the center O of the head H and the camera 810A will be 28 cm. Under the circumstances, the width of the face will occupy 32 degrees of the horizontal field of view.

Please refer to FIG. 8B again, the horizontal field of view of the cameras 810A and 810B is 75°, the depth detection limit is 20 cm, the camera distance is 22.5 cm, and both cameras are inclined inward by an angle of 13°. Assume that the user is standing between the cameras 810A and 810B, and the distance between the place between the eyebrows H1 and the reference line BL is 10 cm. Assume that the center of the human head H is point O, the center point of the two cameras is point B, and the lens center of the camera 810 is point C. There will be point A on the vertical reference line passing through point C. The direction of the line segment C-D is the optical axis direction of the camera 810A, and the point D is the vertical projection point of the point O on the line segment C-D.

Figure 8C:
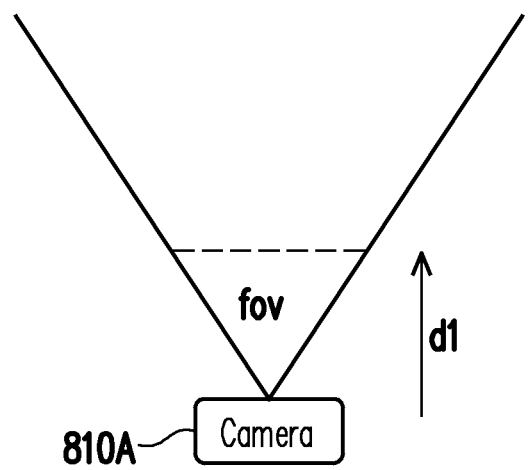

Here, the line segment B-C is half the camera distance, that is, 11.25 cm. The line segment O-B is the distance of 18 cm from the center O of the human head to the reference line BL. Since the camera 820A is inclined inward by 13°, the angle ∠ACD is 13°. With trigonometric functions, it can be derived that the angle ∠OCB is 58°, the line segment O-C on the inclined side is 21.23 cm, and the angle ∠ACD is 19°. Finally, it can be computed that the line segment C-D is 28 cm, and the depth of the human head surface is 20 cm. As shown in FIG. 8C, the user's head can be located within the field of view of the camera 820A and is detectable. Therefore, with such configuration of camera, it is possible to reduce the depth detection limit of a multi-camera system to 10 cm, such that the depth detection limit is better than a single-camera system.

Figure 8D:
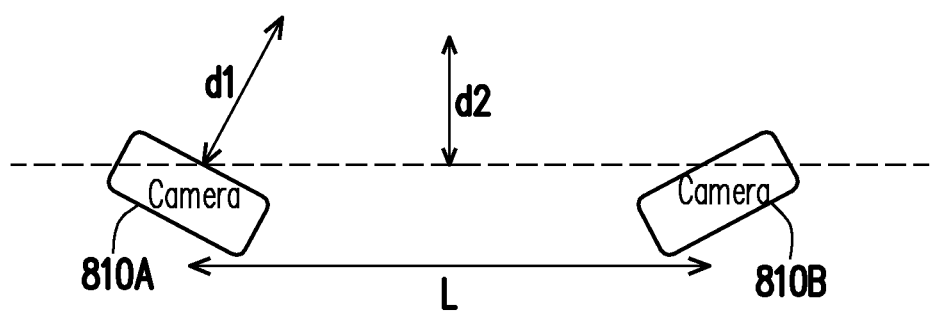

Briefly speaking, please refer to FIG. 8C and FIG. 8D. When the horizontal field of view of a single camera is fov and the depth detection limit is d1, through horizontal configuration and inward-facing angle θ, it is possible to reduce the minimum depth detection limit of the multi-camera system to d2, wherein d2<d1, and the preset distance L between the two cameras will satisfy the following equation (9):

$$L^2 \geq \frac{8d_1^2}{1+\cos fov} - 4d_2^2 \qquad (9)$$

Incidentally, when the user is located near the center point between the camera 810A and the camera 810B, the spatial coordinates of the eyeball can be obtained through the camera 810A and the camera 810B, and the coordinates are respectively converted to the new point (point B) of the reference line BL. Then through the face model, the spatial coordinates of the place between the eyebrows H1 are computed, through which virtual-real interaction with the transparent screen can be performed. Taking FIG. 9A and FIG. 9B as an example, at an image resolution of 640×360, according to a horizontal coordinate x, it can be estimated that the inclination angle θ is $$\left(\frac{x-320}{640} \times \text{horizontal perspective}\right),$$

and the distance between which and the camera can be approximated as the depth value of the face in the camera. Then, the camera inclination angle of 13 degrees is added, which plus the inclination angle, and the included angle between the face and the reference line can be obtained; that is, the included angle is (90°-inward-facing angle-θ). Next, the sine value of the angle multiplied by the depth is the distance from the face to the reference line, which is the converted depth value. In addition, the cosine value of the depth multiplied by the angle is the distance from the face projection point to the camera, which is the converted horizontal coordinate.

When the user is far away from the center point between the cameras 810A and 810B, only one camera may obtain the depth information of the eye on the same side, and the other camera may obtain the pixel position of the other eye. Under the circumstances, the camera nearby can be utilized to roughly estimate the distance of the user by using the size and angle of the face, and then virtual-real interaction is performed with the user.

Figure 9:
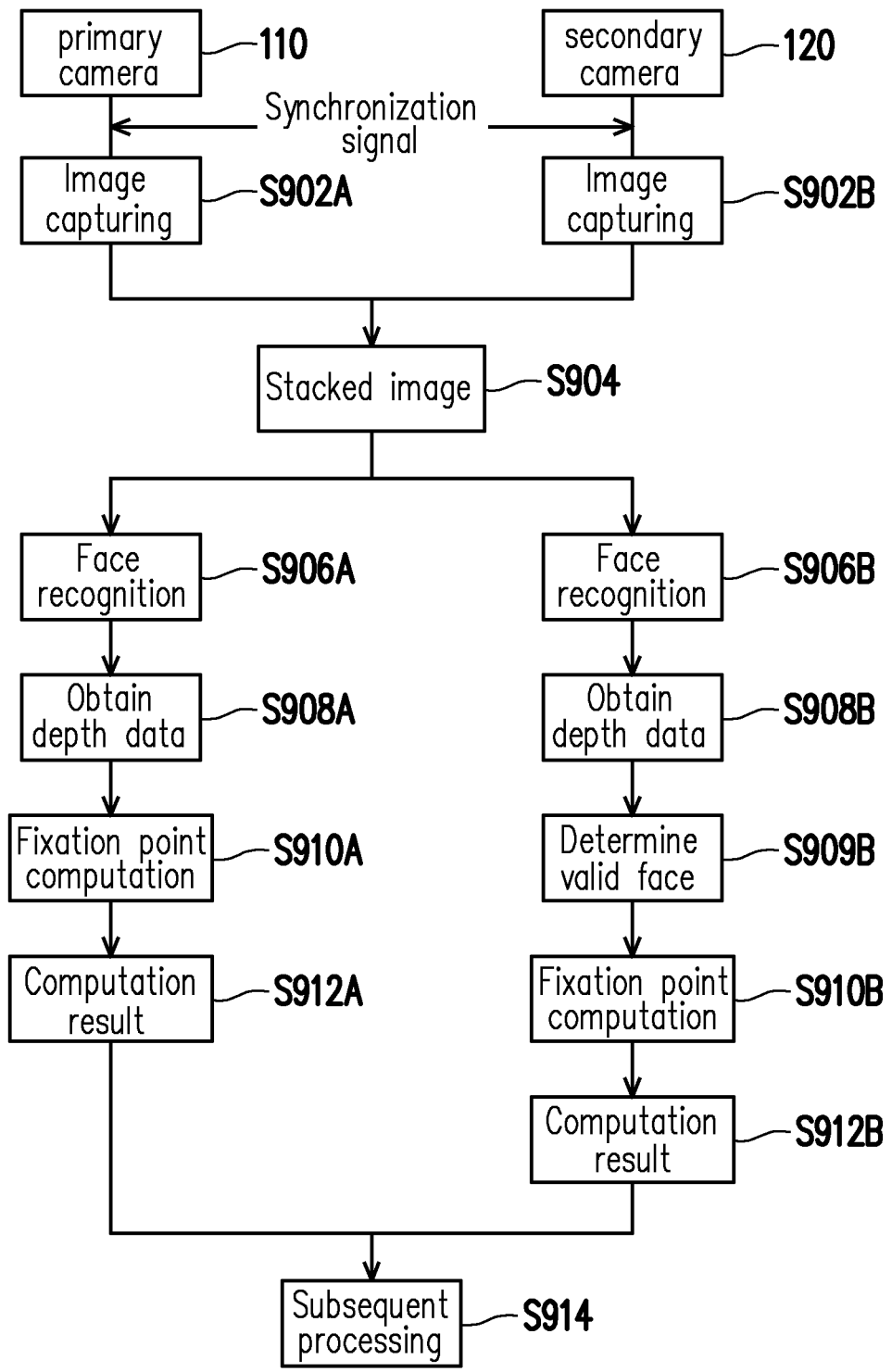
FIG. 9 is a flowchart of an object tracking method according to an exemplary embodiment of the disclosure.

The above exemplary embodiments can be integrated by using the flow chart of the object tracking method shown in FIG. 9 according to an exemplary embodiment of the disclosure, and the process flow in FIG. 9 can be implemented by the object tracking system 100 in FIG. 1.

Please refer to FIG. 9, first, the primary camera 110 and the secondary camera 120 will capture images according to the synchronization signal (step S902A, step S902B), and the processing device 130 will perform image stacking on the image captured by the primary camera 110 and the secondary camera 120 to generate a stacked image (step S904). Next, the processing device 130 will perform face recognition on the primary region and the secondary region in the stacked image (step S906A, step S906B), and obtain depth data from the primary camera 110 and the secondary camera 120 (step S908A, step S908B). For the primary region corresponding to the primary camera 110, the processing device 130 will perform a fixation point computation (step S910A), and generate a computation result (step S912A). For the secondary region corresponding to the secondary camera 120, the processing device 130 will determine a valid face (step S909B), that is, determine whether there is the same face in the secondary region as in the primary region. Thereafter, for the secondary region corresponding to the secondary camera 120, the processing device 130 will perform a fixation point computation on the valid face (step S910B), and generate a computation result (step S912B). Then, the processing device 130 will perform subsequent processing on the computation results obtained from step S912A and step S912B (step S914), and this subsequent processing will be set according to the application scenario. For example, the processing device 130 will display subsequent virtual-real interaction information and so on according to the computation result.

The following Table 3 lists the speed difference between the object tracking system using image stitching and the object tracking system 100 using image stacking for cross-view object tracking methods:

TABLE 3

|  | Estimated time (ms) cost by object tracking system using image stitching | Estimated time (ms) cost by object tracking system 100 |
|---|---|---|
| Image capturing | 24 | 24 |
| Image stitching | 8 | X |
| Image stacking | X | <0.1 |
| Face recognition | 7 | 7 |
| Fixation point computation | 14 | 14 |
| Face tracking | <0.1 | <0.1 |
| Total | 53.1 (18 fps) | 45.2 (22 fps) |

It can be seen from Table 3 that the time cost for image stacking is much less than the time cost for image stitching, so the object tracking system 100 can provide a faster object tracking method.

The disclosed embodiments provide a method, a processing device and a system for object tracking, which can provide object tracking with recognition rate and performance in different fields of view of different cameras, and can effectively avoid repeated computation on the same object.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for object tracking comprising:
    performing image capturing on an actual scene by using a primary camera and at least one secondary camera to respectively generate a primary image and at least one secondary image;
    performing image stacking on the primary image and the at least one secondary image to generate a stacked image;
    computing position information and depth information of each object in the stacked image; and
    determining whether there exist same objects among the objects in the stacked images based on the position information and the depth information of each of the objects.

2. The method according to claim 1, wherein the step of performing image stacking on the primary image and the at least one secondary image to generate the stacked image comprises:
    determining whether the primary camera and the at least one secondary camera are in a vertical shooting mode or a horizontal shooting mode;
    when the primary camera and the at least one secondary camera are in the vertical shooting mode, performing horizontal stacking on the primary image and the at least one secondary image to generate the stacked image; and
    when the primary camera and the at least one secondary camera are in the horizontal shooting mode, performing vertical stacking on the primary image and the at least one secondary image to generate the stacked image.

3. The method according to claim 1, wherein the step of computing the position information and the depth information of each of the objects in the stacked image comprises:
    recognizing each of the objects from the stacked image, wherein the stacked image comprises a primary region corresponding to the primary camera and at least one secondary region corresponding to the at least one secondary camera; and
    determining a vertical coordinate, a horizontal coordinate, and a depth of each of the objects in the primary region and the at least one secondary region.

4. The method according to claim 3, wherein the objects comprise a first object located in the primary region, and wherein the step of determining whether there exist same objects among the objects in the stacked images based on the position information and the depth information of each of the objects comprises:
    determining whether there exists a second object within the at least one secondary region such that a vertical coordinate, a depth, and a horizontal coordinate of the second object and those of the first object respectively satisfy a vertical condition, a depth condition, and a horizontal condition;
    when the vertical condition, the depth condition, and the horizontal condition are all satisfied, determining that there exist same objects among the objects in the stacked images; and
    when any of the vertical condition, the depth condition, and the horizontal condition is not satisfied, determining that there do not exist same objects among the objects in the stacked images.

5. The method according to claim 4, wherein in response to a vertical difference between the vertical coordinate of the second object and the vertical coordinate of the first object being less than a vertical tolerance threshold, determining that the vertical condition is satisfied.

6. The method according to claim 5, wherein when the first object and the second object are human faces, the vertical tolerance threshold is associated with a pixel distance between left and right eyes.

7. The method according to claim 4, wherein when a depth difference between the depth of the second object and the depth of the first object is less than a depth tolerance threshold, determining that the depth condition is satisfied.

8. The method according to claim 7, wherein when the first object and the second object are human faces, the depth tolerance threshold is associated with a diameter of a human head.

9. The method according to claim 4, wherein when a difference between a pixel displacement and a horizontal difference between the horizontal coordinate of the second object and the horizontal coordinate of the first object is less than a horizontal tolerance threshold, determining that the horizontal condition is satisfied.

10. The method according to claim 9, wherein when the first object and the second object are human faces, the horizontal tolerance threshold is associated with a pixel displacement between left and right eyes.

11. The method according to claim 9, wherein when the primary camera and the at least one secondary camera are arranged horizontally with parallel optical axes, the pixel displacement is computed based on a horizontal resolution and a horizontal distance of a field of view of the at least one secondary camera, and a distance between lenses of the primary camera and the at least one secondary camera.

12. The method according to claim 9, wherein when the primary camera and the at least one secondary camera are arranged horizontally with an inward-facing angle, the pixel displacement is computed based on a horizontal resolution and a horizontal distance of a field of view, the inward-facing angle of the at least one secondary camera, and a distance between lenses of the primary camera and the at least one secondary camera.

13. The method according to claim 9, wherein when the primary camera and the at least one secondary camera are arranged horizontally with an outward-facing angle, the pixel displacement is computed based on a horizontal resolution and a horizontal distance of a field of view, the outward-facing angle of the at least one secondary camera, and a distance between lenses of the primary camera and the at least one secondary camera.

14. The method according to claim 1, wherein the actual scene comprises a first recognized object, wherein the primary camera is able to perform depth capturing on the first recognized object, and wherein the at least one secondary camera is not able to perform depth capturing on the first recognized object.

15. The method according to claim 1, wherein the actual scene comprises a first recognized object, wherein the primary camera and the at least one secondary camera are able to perform depth capturing on the first recognized object, and wherein a depth of the first recognized object with respect to the primary camera is greater than or equal to a depth of the first recognized object with respect to each of the at least secondary camera.

16. The method according to claim 1, wherein a number of the at least one secondary camera is greater than 1, wherein the primary camera and the at least one secondary camera have a plurality of overlapping regions of field of views, wherein a total distance between the primary camera and each of the overlapping regions of the field of views is less than a total distance between any of the at least one secondary camera and each of the overlapping regions of the field of views.

17. The method according to claim 1, wherein a number of the at least one secondary camera is greater than 1, wherein the primary camera and the at least one secondary camera have a plurality of overlapping regions of field of views, wherein the actual scene comprises a plurality of recognized objects, wherein a total number of times of pixel coordinate transformations for the main camera with respect to the recognized objects is less than a total number of times of pixel coordinate transformations for any of the at least one secondary camera with respect to each of the recognized objects.

18. The method according to claim 1, wherein when the primary camera and the at least one secondary camera are arranged horizontally, wherein a depth detection limit of the primary camera is a first depth value, wherein when a distance of lenses between the primary camera and the at least one secondary camera is greater than a predetermined distance, a depth detection limit of the primary camera and the at least one secondary camera is a second depth value, wherein the second depth value is less than the first depth value, and wherein the predetermined distance is associated with the first depth value, the second depth value, and a horizontal view of view of the primary camera.

19. A processing device, connected to a primary camera and at least one secondary camera, comprising:
 a memory, configured to store data; and
 a processor, configured to:
  receive a primary image and at least one secondary image respectively generated by the primary camera and the at least one secondary camera that perform image capturing on an actual scene;
  perform image stacking on the primary image and the at least one secondary image to generate a stacked image;
  compute position information and depth information of each object in the stacked image; and
  determine whether there exist same objects among the objects in the stacked images based on the position information and the depth information of each of the objects.

20. A system for object tracking comprising:
 a primary camera, configured to perform image capturing on an actual scene to generate a primary image;
 at least one secondary camera, configured to perform image capturing on the actual scene to generate at least one secondary image; and
 a processing device, connected to the primary camera and the at least one secondary camera, configured to:
  receive the primary image and the at least one secondary image respectively from the primary camera and the at least one secondary camera;
  perform image stacking on the primary image and the at least one secondary image to generate a stacked image;
  compute position information and depth information of each object in the stacked image; and
  determine whether there exist same objects among the objects in the stacked images based on the position information and the depth information of each of the objects.

* * * * *